(12) United States Patent
Uenaka et al.

(10) Patent No.: US 10,389,245 B2
(45) Date of Patent: Aug. 20, 2019

(54) ELECTRIC POWER CONVERTER AND DRIVING APPARATUS

(71) Applicant: Mitsubishi Electric Corporation, Chiyoda-ku (JP)

(72) Inventors: Mai Uenaka, Chiyoda-ku (JP); Matahiko Ikeda, Chiyoda-ku (JP); Ryota Kondo, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 15/576,330

(22) PCT Filed: Sep. 15, 2016

(86) PCT No.: PCT/JP2016/077273
§ 371 (c)(1),
(2) Date: Nov. 22, 2017

(87) PCT Pub. No.: WO2017/047698
PCT Pub. Date: Mar. 23, 2017

(65) Prior Publication Data
US 2018/0183333 A1 Jun. 28, 2018

(30) Foreign Application Priority Data
Sep. 16, 2015 (JP) .................................. 2015-182934

(51) Int. Cl.
*B60L 11/18* (2006.01)
*H02M 3/158* (2006.01)
(Continued)

(52) U.S. Cl.
CPC .......... *H02M 3/158* (2013.01); *H02J 7/0068* (2013.01); *H02J 7/242* (2013.01); *H02M 1/08* (2013.01);
(Continued)

(58) Field of Classification Search
CPC .......... H02J 7/0068; H02J 7/242; H02M 1/08; H02M 2001/0009; H02M 3/158; H02P 27/06
See application file for complete search history.

(56) References Cited

U.S. PATENT DOCUMENTS

| 5,412,293 A | * | 5/1995 | Minezawa | ................ B60L 7/14 318/139 |
| 2005/0099155 A1 | * | 5/2005 | Okuda | ................ F02N 11/0866 320/107 |

(Continued)

FOREIGN PATENT DOCUMENTS

| JP | 2007-097392 A | 4/2007 |
| JP | 2009-201318 A | 9/2009 |

(Continued)

OTHER PUBLICATIONS

International Search Report dated Nov. 1, 2016 in PCT/JP2016/077273, filed on Sep. 15, 2016.

*Primary Examiner* — Muhammad S Islam
(74) *Attorney, Agent, or Firm* — Oblon, McClelland, Maier & Neustadt, L.L.P.

(57) ABSTRACT

An electric power converter including an electric-power conversion circuit that performs bidirectional conversion of a voltage between a DC power source and a motor and outputs the voltage, a first voltage detector that detects an inter-terminal voltage at the DC power source side of the electric-power conversion unit, a second voltage detector that detects an inter-terminal voltage at the motor side of the electric-power conversion unit, and a controller. The controller includes a first calculator that calculates a main duty, based on a target voltage and the inter-terminal voltage at the motor side, and a second calculator that calculates a sub-duty, based on the main duty, the inter-terminal voltage at the motor side, and the inter-terminal voltage, at the DC (Continued)

power source side, detected by the second voltage detection unit. The controller calculates a duty amount for operating the electric-power conversion unit, based on the main duty and the sub-duty.

10 Claims, 8 Drawing Sheets

(51) Int. Cl.
  *H02J 7/00* (2006.01)
  *H02J 7/24* (2006.01)
  *H02M 1/08* (2006.01)
  *H02M 1/38* (2007.01)
  *H02M 1/00* (2006.01)
  *H02P 3/18* (2006.01)
  *H02P 27/06* (2006.01)

(52) U.S. Cl.
  CPC ............ *H02M 1/38* (2013.01); *H02M 3/1588* (2013.01); *H02M 2001/0009* (2013.01); *H02P 3/18* (2013.01); *H02P 27/06* (2013.01); *Y02B 70/1466* (2013.01)

(56) References Cited

U.S. PATENT DOCUMENTS

| 2009/0051337 | A1* | 2/2009 | Yoshida | ................ H02M 3/156 323/283 |
|---|---|---|---|---|
| 2009/0212634 | A1 | 8/2009 | Kojima et al. | |
| 2010/0262308 | A1* | 10/2010 | Anderson | ............. B60G 13/14 700/287 |

FOREIGN PATENT DOCUMENTS

| JP | 2011-167011 A | 8/2011 |
|---|---|---|
| JP | 2013-017302 A | 1/2013 |

\* cited by examiner

ELECTRIC POWER CONVERTER AND DRIVING APPARATUS

TECHNICAL FIELD

The present invention relates to an electric power converter that converts a voltage applied from the outside and then transmits electric power and a driving apparatus utilizing the electric power converter.

BACKGROUND ART

In various kinds of applications such as a hybrid automobile and an electric automobile, there is utilized an electric power converter that can bidirectionally transmit electric power in such a way as to perform power-running operation for converting DC-electric-power voltage inputted from a DC power source such as a battery so as to supply the voltage to a motor and in such a way as to perform regenerative operation for supplying DC electric power generated by the motor to the DC power source. The output voltage, which is outputted from the electric power converter to the motor, fluctuates due to various factors such as fluctuation of a target voltage, load fluctuation of the motor, and a dead time. With regard to these fluctuations of the output voltage, there has been disclosed (e.g., refer to PTL 1) a control apparatus for a boosting converter that adjusts the gain in feedback control and feed-forward control of the output voltage, based on the difference between the target voltage and the output voltage and the changing rate of the target voltage.

CITATION LIST

Patent Literature

PTL 1: JP-A-2013-17302

SUMMARY OF INVENTION

Technical Problem

In an electric power converter that bidirectionally transmits electric power, the state where charging and discharging currents of a battery become zero occurs when power-running operation is switched to regenerative operation or when regenerative operation is switched to the power-running operation. The foregoing fluctuation of the output voltage due to a dead time occurs when the charging and discharging currents of the battery are approximately zero. In a conventional boosting converter, there is utilized a control method in which charging and discharging currents of a battery is detected and then a dead-time correction amount is determined based on whether the detected current is positive or negative; thus, in order to suppress the output-voltage controllability from being deteriorated due to the dead time, it is required to accurately perform the determination whether the charging current of the battery is positive or negative in the vicinity of zero. However, in practice, there has been a problem that the determination is not correctly performed, due to an error in the current-sensing function or erroneous detection by the sensing unit, and hence the output-voltage controllability is further deteriorated.

The present invention has been implemented in order to solve the foregoing problems; the objective thereof is to provide an electric power converter that raises the tracking capability of the control even when a dead time causes the output voltage to fluctuate.

Solution to Problem

An electric power converter according to the present invention is a power source apparatus, one terminal of which is connected with a DC power source and the other terminal of which is connected with a motor; the electric power converter includes an electric-power conversion unit that performs bidirectional conversion of a voltage between the DC power source and the motor so as to transmit electric power, a first voltage detection unit that detects an inter-terminal voltage at the DC power source side of the electric-power conversion unit, a second voltage detection unit that detects an inter-terminal voltage at the motor side of the electric-power conversion unit, and a control unit that controls conversion operation of the electric-power conversion unit; the electric power converter is characterized in that the control unit includes a first calculation unit that calculates a main duty, based on a predetermined target voltage and the inter-terminal voltage, at the motor side, that is detected by the first voltage detection unit, and a second calculation unit that calculates a sub-duty, based on the inter-terminal voltage, at the DC power source side, that is calculated from the main duty calculated by the first calculation unit and the inter-terminal voltage, at the motor side, that is detected by the first voltage detection unit and the inter-terminal voltage, at the DC power source side, that is detected by the second voltage detection unit, and in that the control unit calculates a duty amount for operating the electric-power conversion unit, based on the main duty and the sub-duty.

A driving apparatus according to the present invention includes a DC power source, a motor, and an electric power converter, one terminal of which is connected with the DC power source and the other terminal of which is connected with the motor; the driving apparatus is characterized in that the electric power converter includes an electric-power conversion unit that performs bidirectional conversion of a voltage between the DC power source and the motor so as to transmit electric power, a first voltage detection unit that detects an inter-terminal voltage at the DC power source side of the electric-power conversion unit, a second voltage detection unit that detects an inter-terminal voltage at the motor side of the electric-power conversion unit, and a control unit that controls conversion operation of the electric-power conversion unit, in that the control unit includes a first calculation unit that calculates a main duty, based on a predetermined target voltage and the inter-terminal voltage, at the motor side, that is detected by the first voltage detection unit, and a second calculation unit that calculates a sub-duty, based on the inter-terminal voltage, at the DC power source side, that is calculated from the main duty calculated by the first calculation unit and the inter-terminal voltage, at the motor side, that is detected by the first voltage detection unit and the inter-terminal voltage, at the DC power source side, that is detected by the second voltage detection unit, and in that the control unit calculates a duty amount for operating the electric-power conversion unit, based on the main duty and the sub-duty.

Advantage of Invention

An electric power converter according to the present invention makes it possible to perform control at a high response speed for a deviation amount of the dead time; thus, the tracking capability of output-voltage control for the effect of the dead time can be raised.

DESCRIPTION OF EMBODIMENTS

Embodiment 1

Figure 1:
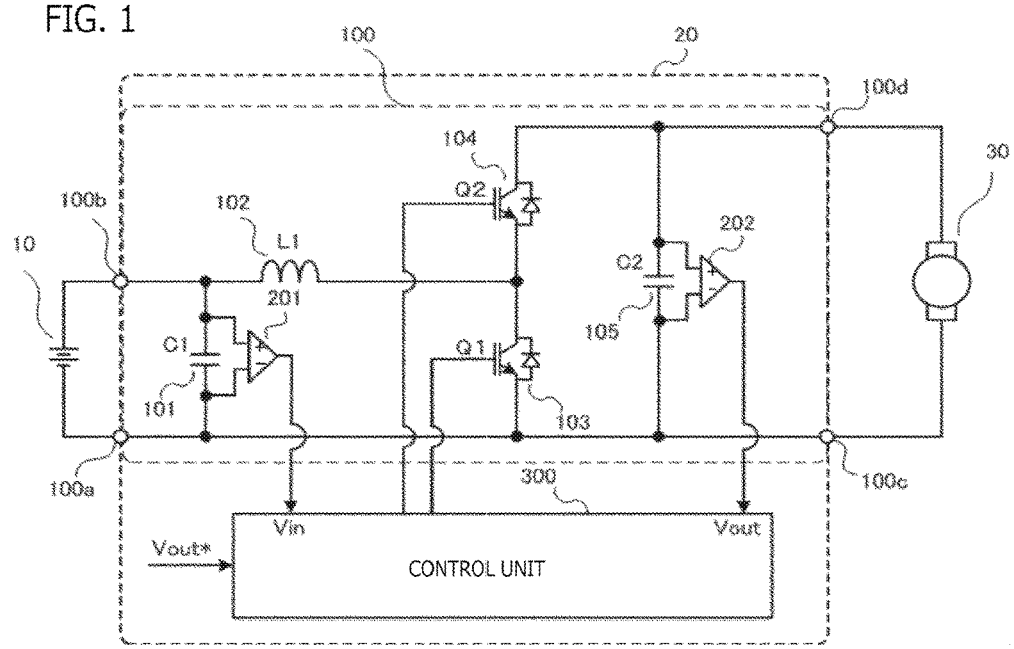
FIG. 1 is a configuration diagram representing an electric power converter and a driving apparatus described in Embodiment 1 of the present invention.
Figure 2:
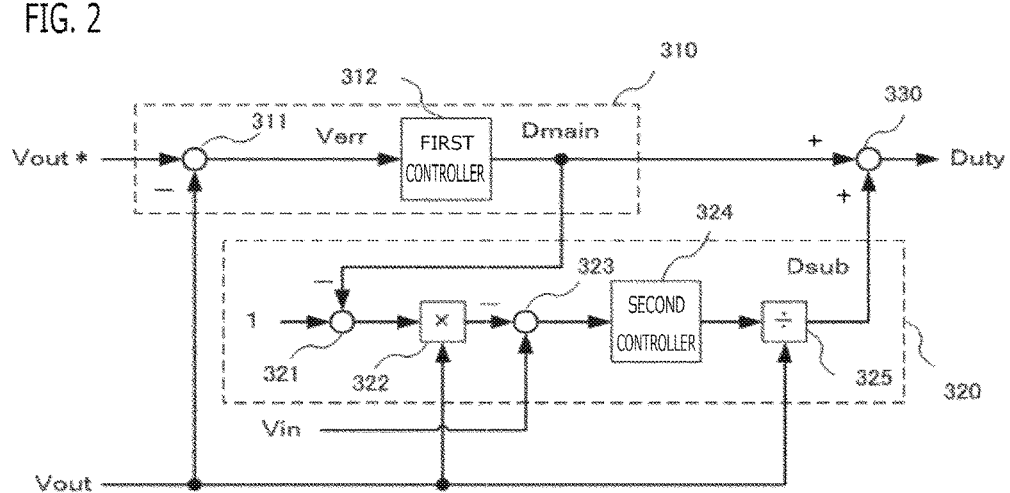
FIG. 2 is a configuration diagram representing a control unit in the electric power converter described in Embodiment 1 of the present invention.

An electric power converter and a driving apparatus according to Embodiment 1 of the present invention will be explained by use of drawings. FIG. 1 is a configuration diagram representing an electric power converter and a driving apparatus according to Embodiment 1 of the present invention. FIG. 2 is a circuit diagram representing the configuration of a control unit. A driving apparatus represented in FIG. 1 is configured with a DC power source 10, an electric power converter 20, and a motor 30. The electric power converter 20 is configured with an electric-power conversion unit 100 and a control unit 300; the DC power source 10 is connected with one terminal of the electric-power conversion unit 100 and the motor 30 is connected with the other terminal thereof.

In FIG. 1, the motor 30 is a motor that drives and rotates the axle of an automobile and that can operate as an electric power generator. When the motor 30 is driven, electric-power transmission (power-running operation) from the DC power source 10 to the motor is performed; when the motor 30 generates electric power, electric-power transmission (regenerative operation) from the motor 30 to the DC power source 10 is performed. That is to say, the driving apparatus described in Embodiment 1 is a system that can bidirectionally transmit the electric energy of the battery and the mechanical energy of the motor. Hereinafter, the explanation will be made under the assumption that the motor 30 is utilized to drive and rotate the axle of an automobile, a railway vehicle, or the like and that in accordance with the traveling state of an automobile or a railway vehicle, the power-running operation and the regenerative operation are switched to each other, as required.

In FIG. 1, the DC power source 10 is a battery; when the power-running operation is performed, electric charges on the battery is discharged to the motor 30 while the voltage to be applied to the motor 30 is controlled; when the regenerative operation is performed, the battery is charged with DC electric power generated by the motor 30, while the voltage to be applied to the motor 30 is controlled. The DC power source 10 is not limited to a battery and may be an arbitrary device as long as it is a circuit or an apparatus that can receive and output DC electric power.

The electric power converter 20 is configured with the electric-power conversion unit 100 and the control unit 300. The electric-power conversion unit 100 is a bidirectional electric-power conversion circuit that can perform bidirectional transmission of electric power between the low voltage side and the high voltage side, and includes a first terminal 100a, a second terminal 100b, a third terminal 100c, and a fourth terminal 100d. The first and second terminals 100a and 100b, which are terminals at the low voltage side, are connected with the respective ends of the DC power source 10; the third and fourth terminals 100c and 100d, which are terminals at the high voltage side, are connected with the respective ends of the motor 30.

The electric-power conversion unit 100 is a boosting chopper circuit including an input capacitor (C1) 101, a reactor (L1) 102, a first switching device (Q1) 103, a second switching device (Q2) 104, and an output capacitor (C2) 105. The electric-power conversion unit 100 is also provided with two voltage detection circuits. There are provided an input voltage detection unit (a first voltage detection unit) 201 that detects the voltage across the terminals at the DC power source 10 side, i.e., the voltage across the input capacitor (C1) 101 (hereinafter, referred to as an input voltage Vin) and an output voltage detection unit (a second voltage detection unit) 202 that detects the voltage across the terminals at the motor 30 side, i.e., the voltage across the output capacitor (C2) 105 (hereinafter, referred to as an output voltage Vout).

The input capacitor (C1) 101 is connected in parallel with the DC power source 10, and one of the terminals of the reactor (L1) 102 is connected with the input capacitor (C1) 101. One of the terminals of the output capacitor (C2) 105 is connected with the drain of the second switching device 104, and the other one thereof is connected with the input capacitor (C1) 101.

The drain of the first switching device (Q1) 103 is connected with the other one of the terminals of the reactor (L1) 102, and the source thereof is connected with one of the terminals of the input capacitor (C1) 101. The source of the second switching device (Q2) 104 is connected with the connection portion between the reactor (L1) 102 and the first switching device (Q1). As each of the first switching device (Q1) 103 and the second switching device (Q2) 104, which are switching semiconductors, an IGBT (Insulated Gate Bipolar Transistor), a MOSFET (Metal-Oxide-Semiconductor Field-effect Transistor), or the like is utilized. The first switching device (Q1) 103 and the second switching device (Q2) 104 perform complementary switching, based on gate signals generated by a gate signal output unit in the control unit 300. In order to prevent short-circuiting caused by the phenomenon that both the first switching device (Q1) 103 and the second switching device (Q2) 104 turn on, there is provided a period (dead time) in which both the first switching device (Q1) 103 and the second switching device (Q2) 104 are off.

The input voltage detection unit 201, which is connected across the input capacitor (C1) 101, is a voltage sensor that detects an input voltage Vin of the electric power converter 20. The output voltage detection unit 202, which is connected across the output capacitor (C2) 105, is a voltage sensor that detects an output voltage Vout of the electric power converter 20. In order to prevent erroneous detection caused by a ripple voltage or noise corresponding to a switching frequency, each of these detection units has an appropriate lowpass filter circuit. It is not necessarily required that the input voltage detection unit 201 and the output voltage detection unit 202 are provided in the electric-power conversion unit 100; they may be provided outside the electric-power conversion unit 100.

The control unit 300 is a control apparatus that controls the electric-power conversion unit 100. That is to say, based on the input voltage Vin detected by the input voltage detection unit 201, the output voltage Vout detected by the output voltage detection unit 202, and a target voltage Vout*, the control unit 300 determines a duty amount and then outputs, to the electric-power conversion unit 100, gate signals for controlling the first switching device (Q1) 103 and the second switching device (Q2) 104. FIG. 2 is a circuit diagram representing the detailed configuration of the control unit 300. The control unit 300 has a first calculation unit 310 that calculates a main duty amount Dmain by use of the output voltage Vout and the target voltage Vout*, a second calculation unit 320 that calculates a sub-duty amount Dsub by use of the main duty amount Dmain calculated by the first calculation unit 310, the input voltage Vin, and the output voltage Vout, and an adder 330 that adds Dmain and Dsub so as to calculate a duty amount.

The output voltage (Vout) is controlled in such a way as to keep track of the target voltage Vout* that is preliminarily set by an unillustrated external apparatus or the like in accordance with the traveling state. The control unit 300 calculates respective duty amounts for the first switching device (Q1) 103 and the second switching device (Q2) 104 of the electric-power conversion unit 100 and then performs control based on the calculated duty amounts, by use of gate signals. As a result, for example, the motor efficiency can be raised.

The first calculation unit 310 has a subtractor 311 that calculates the difference between the target voltage Vout* and the output voltage Vout and a first controller 312 that calculates a main duty amount (Dmain) from a difference value (Verr) obtained by the subtractor 311. The second calculation unit 320 has a subtractor 321 that calculates the difference between "1" and Dmain obtained by the first calculation unit 310, a multiplier 322 that multiplies the difference value obtained by the subtractor 321 by the output voltage Vout, a subtractor 323 that obtains the difference between the value obtained by the multiplier 322 and the input voltage Vin, a second controller 324 that performs calculation processing by use of the value obtained by the subtractor 323, and a divider 325 that calculates the quotient of the value, obtained by the second controller 324, divided by the output voltage Vout.

The motor 30 has an inverter circuit, unillustrated in FIG. 1; a DC voltage inputted to the motor 30 is inverted into an AC voltage so as to drive and rotate a driving unit for the motor 30. The respective on-time ratios of the first switching device (Q1) 103 and the second switching device (Q2) 104 are controlled, so that a target voltage is applied to the DC unit of the inverter circuit and hence the motor 30 can be driven.

Next, the operation of each of the electric power converter and the driving apparatus according to Embodiment 1 will be explained. As the operation state of the electric power converter 20, there exist two operation items, i.e., a state (power-running operation) in which electric power is supplied from the DC power source 10 to the motor 30 so that the motor is driven and a state (regenerative operation) in which electric power generated by the motor 30 in a power generation state is supplied to the DC power source 10.

Figure 3:
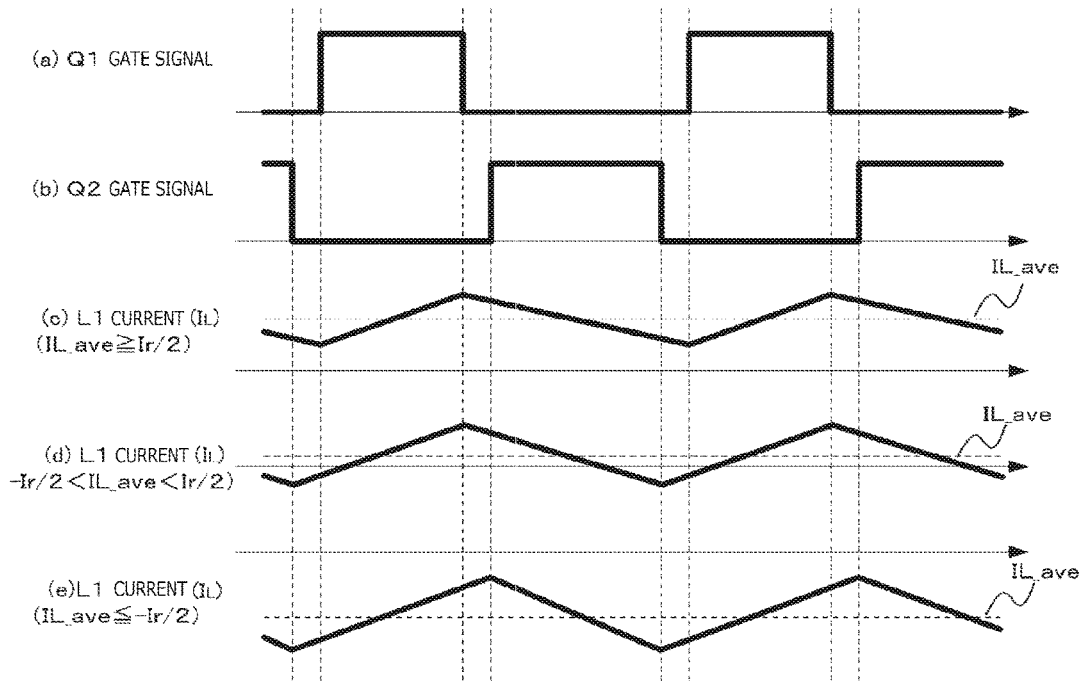
FIG. 3 is a chart representing the relationship between a gate signal and a current flowing in a reactor in the electric power converter described in Embodiment 1 of the present invention.

FIG. 3 represents the respective waveforms of the gate signal voltages for the first switching device (Q1) 103 and the second switching device (Q2) 104 and the respective waveforms of reactor currents IL that flow in the reactor (L1) 102. In FIG. 3, (a) and (b) represent the waveform of the gate signal for the first switching device (Q1) 103 and the waveform of the gate signal for the second switching device (Q2) 104, respectively. Each of the switching devices performs on/off-operation in accordance with an inputted gate signal. Each of (c) through (e) represents the waveform of the current that flows in the reactor (L1) 102; the waveform corresponding to the value of the average current IL_ave in the reactor L1 is represented. Letting it denote the ripple current in the reactor L1, (C), (d), and (e) represent the case where [IL_ave≥Ir/2] is established, the case where [−Ir/2<IL_ave<Ir/2] is established, and the case where [IL_ave≥−Ir/2] is established, respectively.

In the power-running operation, the control unit 300 transmits the respective gate signals to the first switching device (Q1) 103 and the second switching device (Q2) 104 so that the first switching device (Q1) 103 and the second switching device (Q2) 104 are operated. While the first switching device (Q1) 103 and the second switching device (Q2) 104 are made to repeatedly perform on/off-operation and hence the voltage to be applied across the motor 30 is boosted up to a target voltage, input electric power from the DC power source 10 is transmitted to the motor 30. In the motor 30 to which DC electric power is inputted through the electric power converter 20, the internal inverter circuit inverts the DC electric power into AC electric power, so that the driving unit of the motor 30 is driven and rotated.

In FIG. 3, in the period in which the first switching device (Q1) 103 is off and the second switching device (Q2) 104 is on, energy inputted from the DC power source 10 to the electric power converter 20 is accumulated in the output capacitor 105. In contrast, in the period in which the first switching device (Q1) 103 is on and the second switching device (Q2) 104 is off, the energy accumulated in the output capacitor 105 is discharged. The time ratio (duty amount having the value of 0 through 1) of the period in which the first switching device (Q1) 103 is on is appropriately adjusted, so that the output voltage Vout between the third terminal 100c and the fourth terminal 100d is controlled to be an arbitrary voltage. In this situation, the control unit 300 determines the duty amount; based on the determined duty amount, the control unit 300 transmits the respective gate signals to the switching devices so as to control the electric-power conversion unit 100. The method of calculating the duty amount will be described later.

Next, the regenerative operation, i.e., the case where [IL_ave<0] is established will be explained.

As is the case with the power-running operation, in the regenerative operation, the control unit 300 transmits the respective gate signals to the first switching device (Q1) 103 and the second switching device (Q2) 104 so that the first switching device (Q1) 103 and the second switching device (Q2) 104 are operated. While the first switching device (Q1) 103 and the second switching device (Q2) 104 are made to repeatedly perform on/off-operation and hence the voltage to be applied across the motor 30 is boosted up to a target voltage, input electric power from the motor 30 is transmitted to the DC power source 10 so that the DC power source 10 is charged with the DC electric power.

In FIG. 3, in the period in which the first switching device (Q1) is off and the second switching device (Q2) is on, the energy accumulated in the output capacitor 105 is discharged. In contrast, in the period in which the first switching device (Q1) is on and the second switching device (Q2) is off, energy inputted from the motor 30 is accumulated in the output capacitor 105. As is the case with the power-running operation, the time ratios (duty amounts) of these operation modes are appropriately adjusted, so that the output voltage Vout between the third terminal 100c and the fourth terminal 100d is controlled to be an arbitrary voltage. In this situation, the control unit 300 determines the duty amounts and then, the control unit 300 transmits the respective gate signals to the electric-power conversion unit 100, so that the operation based on the calculated duty amounts can be performed. The method of calculating the duty amount will be described later.

In this situation, the method with which the control unit 300 calculates the duty amount will be explained. The control unit 300 is characterized in that it calculates the main duty amount (Detain) and the sub-duty amount (Dsub), based on the input voltage Vin and the output voltage Vout detected by the input voltage detection unit 201 and the output voltage detection unit 202, respectively, provided in the electric-power conversion unit 100 and a target voltage Vout*, and in that it calculates the duty amount by use of the calculated main duty amount (Dmain) and the sub-duty amount (Dsub). The control operation is continuously performed or repeatedly performed every fixed time (e.g., every several microseconds), so that an appropriate duty amount can be maintained. The detail will be explained below.

When the control operation for the duty amount is implemented, the control unit 300 receives the input voltage Vin and the output voltage Vout detected by the input voltage detection unit 201 and the output voltage detection unit 202, respectively. In the first calculation unit 310, the subtractor 311 calculates the difference value Verr between the target voltage Vout*, which is a value predetermined in accordance with the traveling state and the like, and the output voltage Vout. The first controller 312 calculates the main duty amount (Dmain) by use of the difference value (Verr). That is to say, the main duty amount (Dmain) is determined in such a way that the difference value (Verr) approaches zero.

The first controller 312 determines the main duty amount (Detain), for example, by means of P control, PI control, PID control, or the like. The first calculation unit 310 secures the responsiveness to a change in the output voltage Vout; in addition to that, even when due to a steep fluctuation of the motor 30, the output voltage Vout deviates from the target voltage Vout*, the first calculation unit 310 can be operated in such a way that the output voltage Vout keeps track of the target voltage Vout*, through the responsiveness determined by the control unit 300, the electric-power conversion unit 100, and the output voltage detection unit 202.

In contrast, the second calculation unit 320 calculates the sub-duty amount (Dsub) by use of the main duty amount (Dmain) calculated by the first calculation unit 310, the input voltage Vin, and the output voltage Vout. Specifically, the subtractor 321 calculates (1−Dmain), and then, the multiplier 322 multiplies (1−Dmain) by the detected output voltage Vout. The result is an input-voltage estimation value Vincal. The equation (1) is a calculation formula provided for processing in the subtractor 321 and the multiplier 322.

$$(1-D_{main}) \times V_{out} = V_{incal} \quad (1)$$

The subtractor 323 calculates the difference value between the Vincal obtained from the multiplier 322 and the input voltage Vin detected by the input voltage detection unit 201 and then outputs the calculated difference value to the second controller 324. The second controller 324 performs calculation processing, for example, by means of P control, PI control, PID control, or the like. In Embodiment 1, it is assumed that each of the gains of the controllers is a fixed value; however, each of the gains may be a variable value. The divider 325 divides the result obtained by the second controller 324 by the detected output voltage Vout, so that a value corresponding to the duty amount is obtained. This result is the sub-duty amount Dsub.

The first calculation unit 310 calculates Dmain so that the difference between the target voltage Vout* and the detected output voltage Vout approaches zero. Meanwhile, the second calculation unit 320 calculates Dsub so that the duty amount corresponding to the difference between the input-voltage estimation value Vincal obtained through an ideal calculation and the detected input voltage Yin is maintained. The first controller 312 and the second controller 324 have different control means or different gains, so that the response speed based on the duty amount for the difference between the target voltage Vout* and the detected output voltage Vout and the response speed at a time when a deviation from the ideal state occurs and hence Duty suddenly changes can be set to respective individual response speeds.

Figure 4:
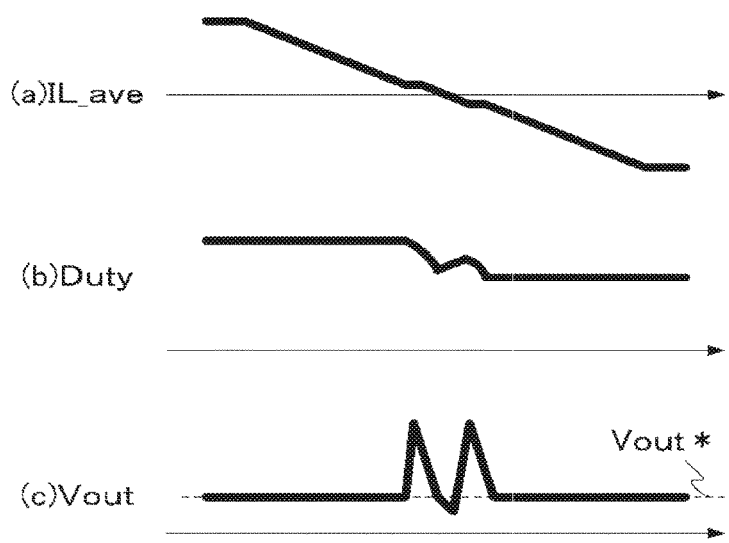
FIG. 4 is a chart representing the waveforms of a current and the like in a conventional electric power converter.
Figure 5:
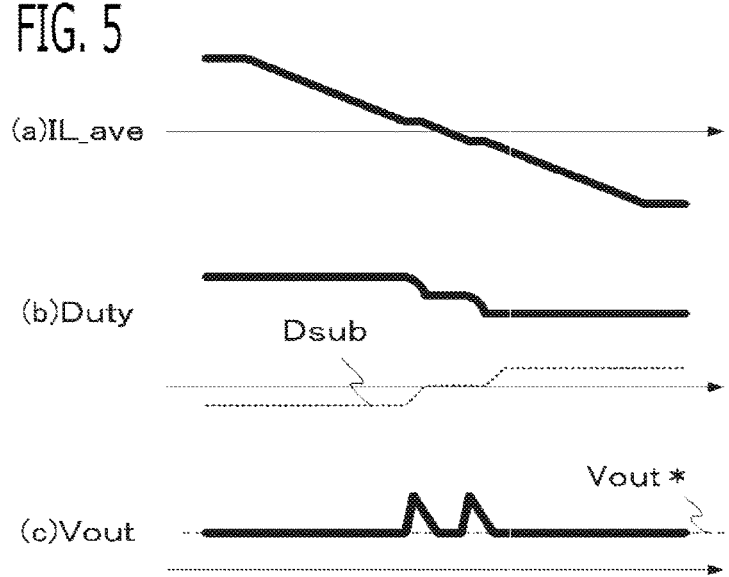
FIG. 5 is a chart representing the waveforms of a current and the like in the electric power converter described in Embodiment 1 of the present invention.

Next, the effect will be explained. At first, the fluctuation of the output voltage Vout, due to a dead time, that should be solved by the present invention will be explained based on the waveforms in FIGS. 4 and 5 FIG. 4 is a chart representing waveforms related to a conventional electric power converter; FIG. 5 is a chart representing waveforms related to the electric power converter described in Embodiment 1. In each of FIGS. 4 and 5, (a) is a chart representing the waveform of the average value (IL_ave) of a current flowing in the reactor (L1); when the operation mode of the electric power converter 20 changes from the power-running operation to the regenerative operation, IL_ave chances from a positive value to a negative value; (b) is a chart representing a duty amount to be set by the control unit 300; (c) is a chart representing the output voltage Vout of the electric power converter 20.

In the case where control is performed by use of the output voltage Vout of the electric-power conversion unit 100 and the target voltage Vout*, the effect of a dead time may enlarge the difference between the output voltage Vout and the target voltage Vout*, as represented in FIG. 4. Letting characters don, T, td, IL_ave, and Ir denote the duty amount for the first switching device (Q1) 103, the switching period, the dead time, the average current in the reactor L1, and the ripple current in the reactor L1, respectively, the dead time period and the on time of the first switching device (Q1) 103 do not overlap with each other when [IL_ave≥Ir/2] is established; thus, the relationship between the input voltage Vin and the output voltage Vout is given as the equation (2).

$$(1-D_{main}) \times V_{out} = V_{incal} \quad (1)$$

In contrast, when [−Ir/2<IL_ave<Ir/2] is established, one side of the dead time period and the on time of the first switching device (Q1) 103 overlap with each other; thus, the relationship between the input voltage Vin and the output voltage Vout is given by the equation (3).

$$V_{out} = \frac{1}{1-\left(d_{on}+\frac{t_d}{T}\right)} V_{in} \quad (3)$$

When [IL_ave≤−Ir/2] is established, each of the both sides of the dead time period and the on time of the first switching device overlap with each other; thus, the relationship between the input voltage Vin and the output voltage Vout is given by the equation (4).

$$V_{out} = \frac{1}{1-\left(d_{on}+\frac{2t_d}{T}\right)} V_{in} \quad (4)$$

As described above, even when the driving is performed with one and the same duty amount, the effect of the dead time makes the output voltage Vout deviate from the equation (2), which is the relational equation of an ideal boosting converter in which the dead time provides no effect.

In this situation, based on FIG. 4, there will be explained the waveforms at a time when a control unit having no second calculation unit 320 but only the first calculation unit 310 is provided.

When the operation mode of the electric power converter changes from the power-running operation to the regenerative operation, the relationship between the average current IL_ave of the reactor current and the ripple current Ir transits from the foregoing equation (2) to the equation (3) and the equation (4), in that order. The dead time td is superficially added to the duty amount for the first switching device (Q1) 103; thus, in the case where the duty amount calculated by the control unit corresponds to the duty amount don for the first switching device (Q1) 103, the Dmain calculated by the first calculation unit 310 decreases by the dead time td each time the state transits. In the case where the second calculation unit 320 is not provided, Dmain becomes a duty amount for controlling the electric-power conversion unit 100.

In a transition period in which the state transits from the equation (2) to the equation (3) and in a transition period in which the state transits from the equation (3) to the equation (4), the waveform of the current in the reactor L1 is discontinuous and hence the duty-amount operation amount based on the feedback control is not reflected in the effect that is provided to the output voltage. As a result, the output voltage Vout does not keep track of the target voltage Vout* and an overshoot occurs. In the case where the gain of the first controller 312 is too high, an undershoot continuously occurs at the instant when the state where the current is discontinuous ends. In the case where the gain of the first controller 312 is too low, the amount of the overshoot increases. Similarly, in the case where the operation mode of the system changes from the regenerative operation to the power-running operation, the output voltage Vout does not keep track of the target voltage Vout* and an undershoot occurs.

Next, based on FIG. 5, the waveforms related to the electric power converter having the second calculation unit 320, which is a characteristic of the present invention, will be explained.

The second calculation unit 320 calculates the sub-duty amount Dsub, based on the amount of the deviation from the ideal state expressed by the equation (1). In the case where the second controller 324 performs P control, the current in the reactor L1 is discontinuous, and the second calculation unit 320 changes Dsub in proportion to the difference when an overshoot occurs. Because a value corresponding to the time ratio (Td/fsw) of the dead time is calculated in accordance with each operation state, no undershoot occurs in the state, indicated by the equation (3), at a time when the discontinuous state ends. Accordingly, it is made possible that the first calculation unit 310 is designed in such a way as to have a sufficient response speed for a fluctuation of the target voltage and that the second calculation unit 320 is designed in such a way to calculate at a high response speed a deviation amount caused by the dead time; thus, it is made possible that with a single duty amount, an appropriate response is secured against different disturbances.

The electric power converter and the driving apparatus described in Embodiment 1 are configured in such a manner as explained above; thus, even in the case where in the situation in which the power-running operation and the regenerative operation are switched to each other, the amount of the current flowing in the internal reactor approaches zero, deterioration in the controllability can be suppressed and hence the tracking capability of the control can be raised also for a fluctuation of the output voltage caused by the dead time.

Embodiment 2

Figure 6:
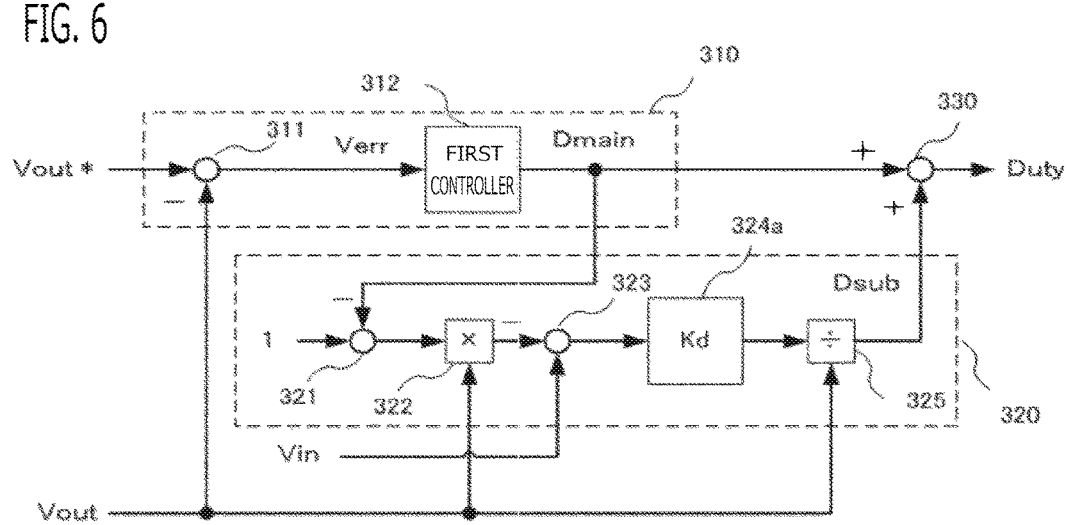
FIG. 6 is a configuration diagram representing a control unit in an electric power converter described in Embodiment 2 of the present invention.

In the electric power converter described in Embodiment 1, the duty amount is set while the gain of each of the controllers in the control unit is fixed; however, with regard to an electric power converter described in Embodiment 2, the case where the gain of a controller is variable will be explained. The configurations of an electric power converter and a driving apparatus according to Embodiment 2 are the same as those of the electric power converter and the driving apparatus represented in FIG. 1; therefore, explanations therefor will be omitted. FIG. 6 represents the configuration of a control unit 300 according to Embodiment 2. The configuration of the control unit 300 according to Embodiment 2 is the same as that of the control unit according to Embodiment 1; however, the operation of a second controller 324a is different. The detail thereof will be explained below.

The operational actions of the electric power converter and the driving apparatus according to Embodiment 2 are the same as those of the electric power converter and the driving apparatus according to Embodiment 1, excluding the duty amount setting method in the control unit 300; therefore, explanations therefor will be omitted. The duty amount setting method is the same as that in Embodiment 1, excluding the duty amount setting method in the second controller 324a.

As is the case with the control unit described in Embodiment 1, the second controller 324a applies calculation processing to the result obtained in the subtractor 323; however, unlike the case described in Embodiment 1, the gain thereof is variable. Letting y denote the calculation result in the second controller 324a, the second controller 324a applies the calculation processing expressed by the equation (5) below to the calculation result (x) in the subtractor 323.

$$y = Kd \times x \qquad (5)$$

Figure 7:
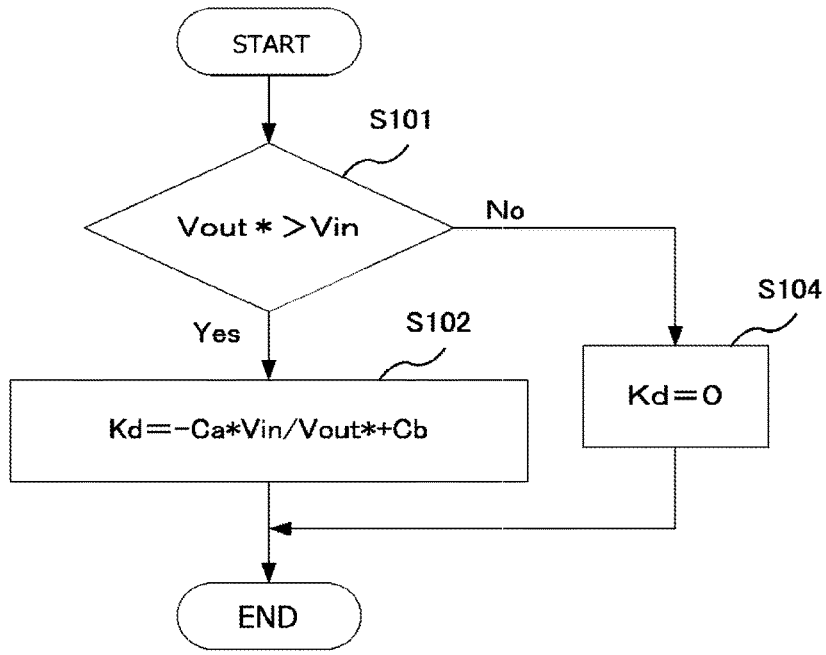
FIG. 7 is a flowchart for calculating a coefficient in the control unit of the electric power converter described in Embodiment 2 of the present invention.

Here, the setting method for the value of a coefficient Kd by which the calculation result x in the subtractor 323 is multiplied will be explained, by use of FIG. 7. FIG. 7 is a flowchart representing the setting method for the coefficient Kd in the second controller 324a. In the step S101, it is determined whether or not the present operation state is the boosting operation state, based on the target voltage Vout* and the input voltage Vin. In the case where the result of determination on [Vout*>Vin] is No, the present operation state is not the boosting operation state and hence the dead time provides no effect; thus, Kd is set to "0" in the step S104.

In the case where the result of the determination in the step S101 is Yes, i.e., in the case where the electric power converter 20 is in the boosting operation state, Kd is determined according to the equation (6) in the step S102.

$$Kd = -Ca \times Vin/Vout^* + Cb \qquad (6)$$

In the equation (6), Ca and Cb are arbitrary coefficients; thus, Kd becomes a variable value in accordance with, at least, the ratio of the input voltage Vin to the target voltage Vout*. In general, the amount of an overshoot caused by a dead time is large when the boosting ratio (Vout*/Vin) is high and is small when the boosting ratio (Vout*/Vin) is low. When it is assumed that the feedback control has a characteristic such that the stability thereof is high when the boosting ratio is high and such that the stability thereof is low when the boosting ratio is low, it is made possible that by use of the calculation result to be determined in the step S102, Kd is utilized as a variable gain. As the calculation method for the variable gain to be utilized in the step S102, there may be utilized a calculation based on the input voltage Vin, the output voltage Vout or the target voltage Vout*, the main duty amount Dmain, the value of the current in the reactor (L1), or the like. As the calculation method for the variable gain in the step S101, a linear equation or a quadratic equation may be utilized. There can be utilized a calculation formula for calculating an appropriate value of Kd, based on the stability of the feedback control, determined by the circuit constants of the first calculation unit, the second calculation unit, and the electric-power conversion unit. In the step S102, there may be utilized a method in which the value of Kd is determined not by use of a calculation formula but by providing a map based on the conditions of the voltages, the currents, and the like.

The electric power converter and the driving apparatus according to Embodiment 2 are configured in such a manner as described above; therefore, there can be obtained an effect the same as that obtained in Embodiment 1. Furthermore, as Kd of the second controller 324a, different values are utilized in accordance with the boosting ratio or the reactor current, so that it is made possible to realize control that has a large effect of suppressing an overshoot, in accordance with the various conditions, and that is stable.

Embodiment 3

Figure 8:
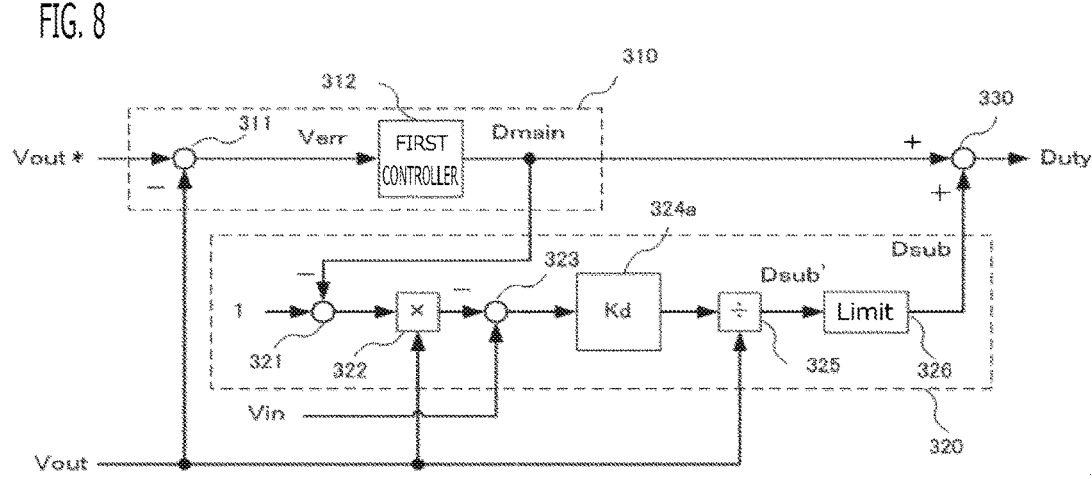
FIG. 8 is a configuration diagram representing a control unit in an electric power converter described in Embodiment 3 of the present invention.

In Embodiment 3, there will be described an electric power converter in which a limiter is provided in the control unit explained in Embodiment 2. The configurations of an electric power converter and a driving apparatus according to Embodiment 3 are the same as those of the electric power converter and the driving apparatus represented in FIG. 1; therefore, explanations therefor will be omitted. FIG. 8 represents the configuration of a control unit 300 according to Embodiment 3. In FIG. 8, explanation for the configurations the same as those in FIG. 6 will be omitted. In FIG. 8, limiter 326 is a computing unit that applies limiter processing to the result of the calculation in the divider 325 so as to limit the variable range thereof.

Next, the operation will be explained.

The operational actions of the electric power converter and the driving apparatus according to Embodiment 3 are the same as those of the electric power converter and the driving apparatus according to Embodiment 1, excluding the duty amount setting method in the control unit 300; therefore, explanations therefor will be omitted. The duty amount setting method is the same as that in Embodiment 2, excluding limiter processing to be applied to the result of the calculation in the divider 325.

In the foregoing embodiments, the result of the calculation by the divider 325 has been referred to as the sub-duty amount Dsub; however, in Embodiment 3, the result of the calculation by the divider 325 is designated with a different reference character Dsub' in a convenient manner. The variable range of Dsub is limited by applying limiter processing to Dsub', which is the result of the calculation by the divider 325. Through the feedback control by the second calculation unit 320, Dsub calculated by the second calculation unit 320 compensates the fluctuation of the output voltage caused by the dead time; thus, the upper and lower limit values are determined by the ratio of the dead time to the switching frequency. In the case where a fixed carrier is utilized, the width is set to "fsw×Td", based on the relationship between the dead time (Td) and the switching period (1/fsw), and the variable range is set to "±fsw×Td÷2".

Figure 9:
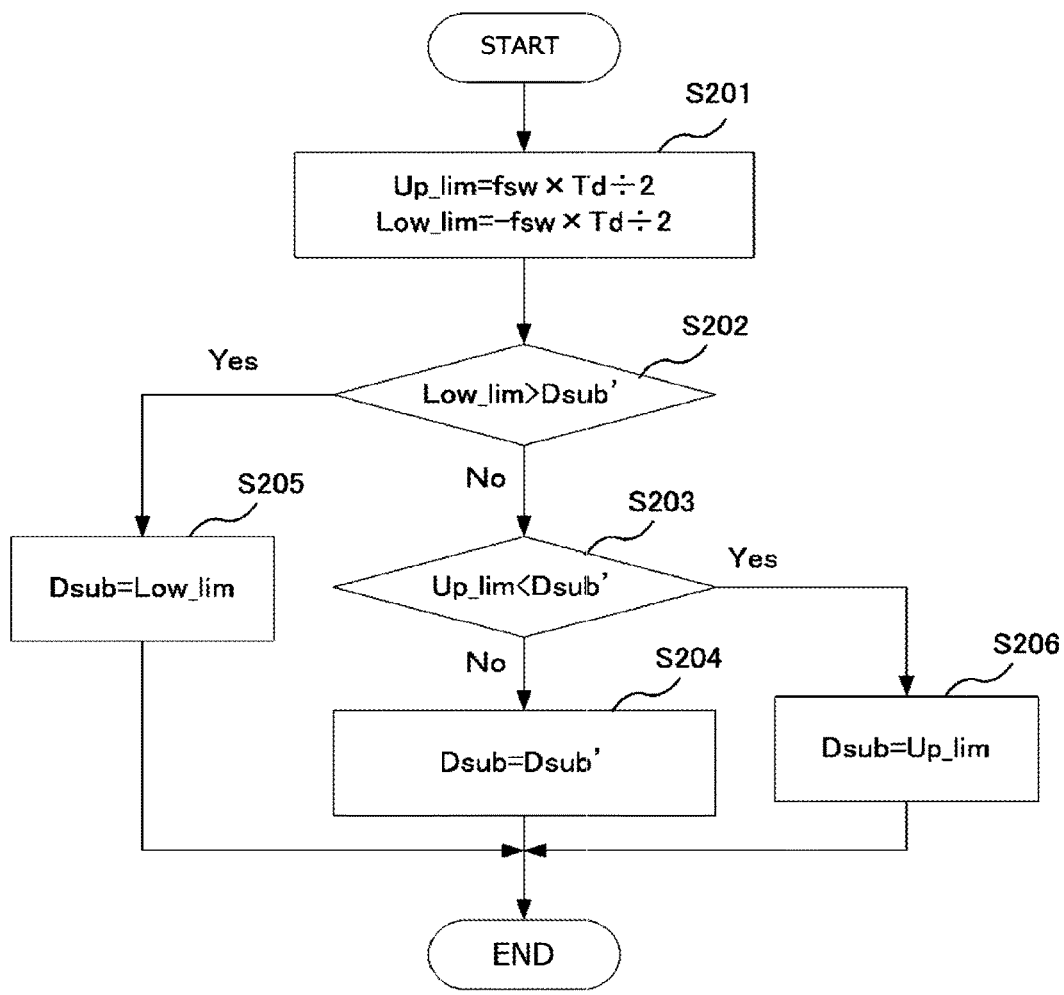
FIG. 9 is a flowchart for calculating a sub-duty amount in the control unit of the electric power converter described in Embodiment 3 of the present invention.

Based on FIG. 9, there will be explained the limiter processing at a time when the switching frequency changes in accordance with the operation condition. FIG. 9 represents a flowchart for calculating the sub-duty amount. In the step S201, the upper limit value (Up_lim) and the lower limit value (Low_lim) are calculated from the currently utilized switching frequency (fsw) and dead time (Td). When in the step S202, Dsub' is smaller than the lower limit value, the lower limit value is set to Dsub in the step S205. When in the step S202, Daub' is larger than the upper limit value, the upper limit value is set to Dsub in the step S206. In the case where neither the condition in the step S202 nor the condition in the step S203 is satisfied, Daub is equal to Daub'.

The electric power converter and the driving apparatus described in Embodiment 3 are configured in such a manner as described above; therefore, there can be obtained an effect the same as that obtained in Embodiment 1. Moreover, it is allowed that the sub-duty amount Daub to be calculated by the second calculation unit 320 is as large as the duty amount just for correcting the dead time; the duty ratio (Td/fsw) of the dead time for each switching frequency (fsw) is calculated and limiter processing is applied to the calculated duty ratio, so that the stability of the feedback control can be secured.

Embodiment 4

Figure 10:
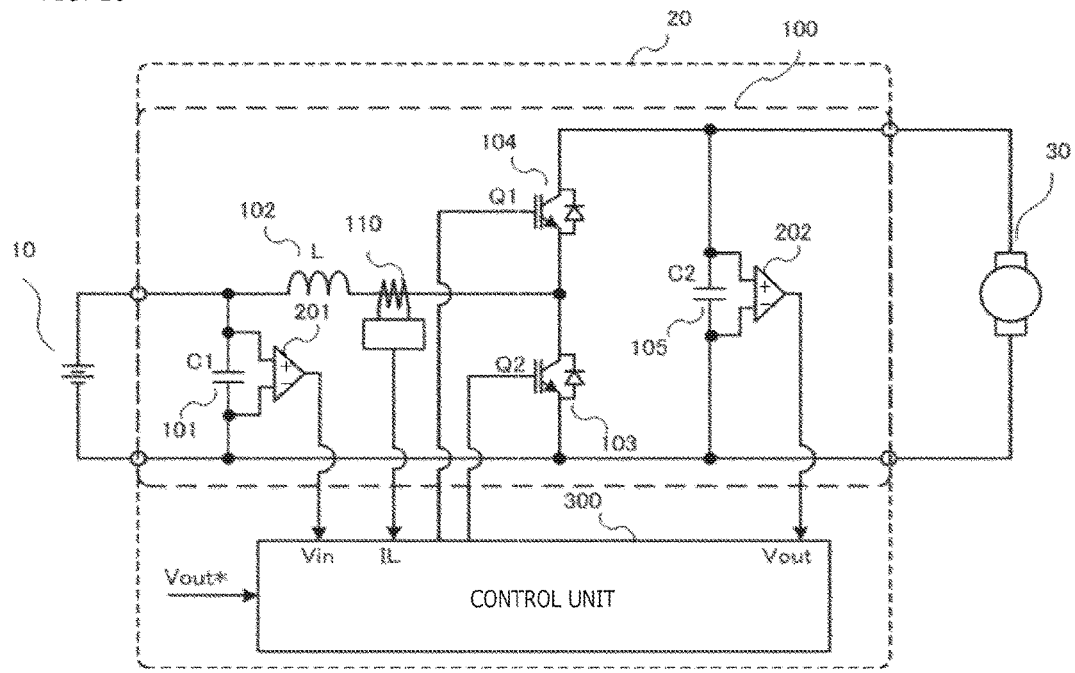
FIG. 10 is a configuration diagram representing an electric power converter and a driving apparatus described in Embodiment 4 of the present invention.

With regard to the electric power converter described in each of the foregoing embodiments, there has been explained a configuration in which in order to ascertain the state inside the electric power converter, a voltage detection unit is utilized; however, with regard to an electric power converter according to Embodiment 4, there will be described the case where a current detection unit is provided, further, and the sub-duty amount is calculated by use of a current flowing in the reactor. FIG. 10 is a block diagram representing the configuration of an electric power converter and a driving apparatus according to Embodiment 4. In FIG. 10, devices or circuits with reference characters the same as those in FIG. 1 denote the same or similar devices or circuits; thus, explanations therefor will be omitted. A current detection unit 110 is a detector for detecting a current flowing in the reactor (L1) 102; for example, the current detection unit 110 is a detector including a shunt resistor and an amplifier or a hall-type current detector. Addition of the current detection unit 110 makes it possible to detect the current IL in the reactor (L1).

Figure 11:
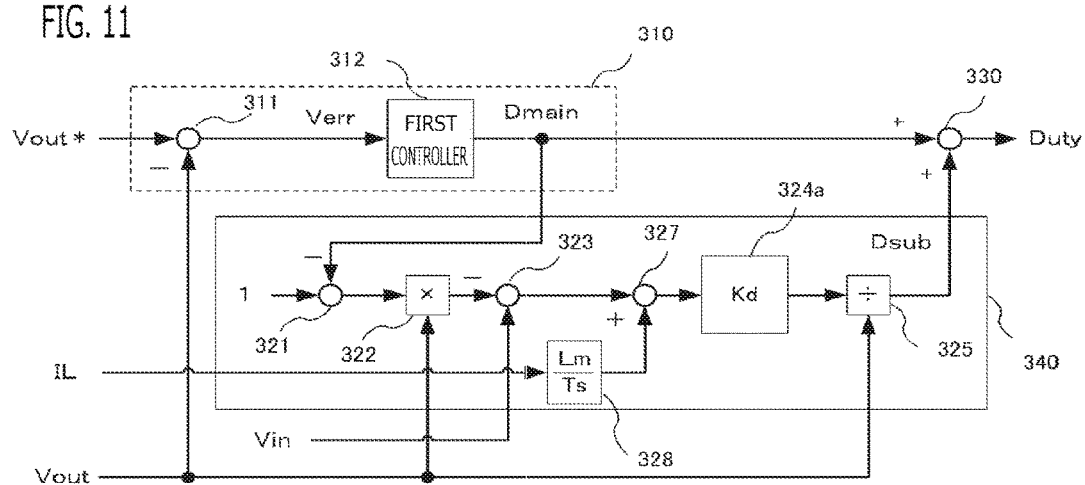
FIG. 11 is a configuration diagram representing a control unit in the electric power converter described in Embodiment 4 of the present invention.

FIG. 11 represents the configuration of a control unit 300 according to Embodiment 4. In comparison with the control unit represented in FIG. 6, a circuit for calculating the sub-duty amount by use of the current IL detected by the current detection unit 110 is added to the control unit 300. Devices or circuits with reference characters the same as those in the control unit represented in FIG. 6 are the same or similar devices or circuits in the control unit represented in FIG. 6; thus, explanations therefor will be omitted. A multiplier 328 is a calculation circuit that multiplies the current IL in the reactor 102 detected by the current detection unit 110 by Lm/Ts. Here, Lm is the inductance value of the reactor 102; in the case of continuous-time control, Ts is set to "1", and in the case of discrete-time control by a microcomputer or the like, Ts is a sampling time. An adder 327 is a calculation circuit for adding the result obtained by the subtractor 323 and the result obtained by the multiplier 328.

Next, the operation will be explained.

The operational actions of the electric power converter and the driving apparatus according to Embodiment 4 are the same as those of the electric power converter and the driving apparatus according to Embodiment 1, excluding the duty amount setting method in the control unit 300; therefore, explanations therefor will be omitted. Up to the calculation by the subtractor 323, setting of the duty amount is performed in the same manner as the control unit 300 described in Embodiment 1 performs the setting of the duty amount.

The multiplier 328 multiplies the current value IL in the reactor (L1) 102, detected by the current detection unit 110, by Lm/Ts. In an adder 327, the calculation result in the subtractor 323 is added to the calculation result in the multiplier 328. In the case of continuous-time control, Ts of the multiplier 328 is set to "1", and in the case of discrete-time control by a microcomputer or the like, a sampling time is utilized as Ts. As Lm, the inductance value of the reactor 102 is utilized; however, the minimum value, the maximum value, or the nominal value of the inductance value of a reactor to be utilized may be adopted as Lm. In a second calculation unit 340, based on the calculation result in the adder 327, the sub-duty amount is calculated by use of the second controller 324a and the divider 325.

The electric power converter and the driving apparatus according to Embodiment 4 are configured in such a manner as described above; therefore, there can be obtained an effect the same as that of the electric power converter and the driving apparatus described in Embodiment 1. Furthermore, the calculation of the dead time based on the reactor current is also performed; thus, the value of the sub-duty amount Dsub can more accurately be calculated and hence there can be obtained an effect that the amount of an overshoot caused by the dead time can further be suppressed.

Embodiment 5

Figure 12:
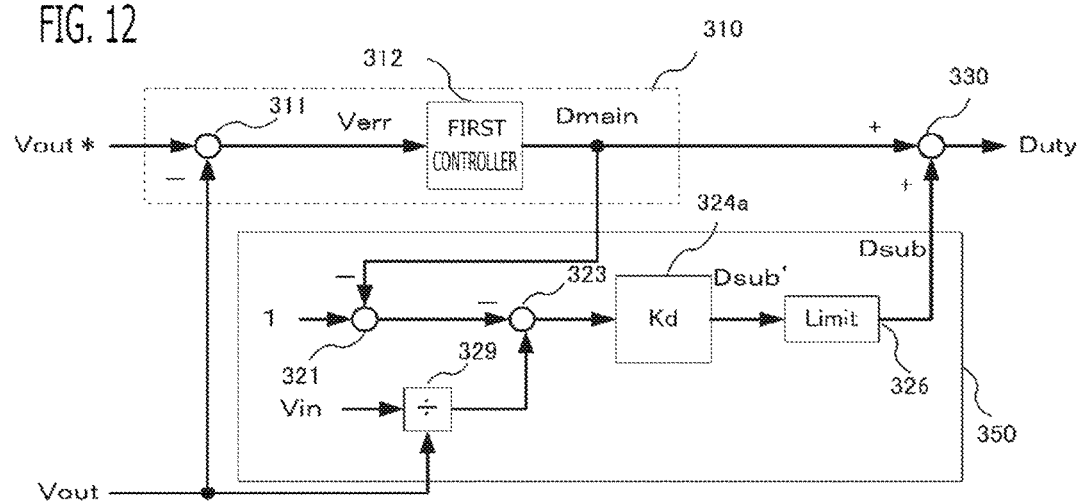
FIG. 12 is a configuration diagram representing a control unit in an electric power converter described in Embodiment 5 of the present invention.

In Embodiment 5, there is described an electric power converter that calculates a sub-duty amount by use of a control unit configured differently from the control unit described in Embodiment 4. The configurations of an electric power converter and a driving apparatus according to Embodiment 5 are the same as those of the electric power converter and the driving apparatus represented in FIG. 1; therefore, explanations therefor will be omitted. FIG. 12 represents the configuration of a control unit 300. In FIG. 12, the first calculation unit 310 is the same as that described in FIG. 2.

As is the case with the second calculation unit described in Embodiment 1, a second calculation unit 350 calculates the sub-duty amount (Dsub) by use of the main duty amount (Dmain) determined by the first calculation unit 310. The second calculation unit 350 has the subtractor 321 that calculates (1−Dmain) by use of the main duty amount (Dmain), a divider 329 that divides the input voltage Vin by the output voltage Vout, the subtractor 323 that calculates the difference between the calculation result in the subtractor 321 and the calculation result in the divider 329, a second controller 324 a that applies calculation processing to the calculation result in the subtractor 323, and the limiter 326 that applies limiter processing to the calculation result in the second controller 324a.

Next, the operation will be explained.

The operational actions of the electric power converter and the driving apparatus according to Embodiment 5 are the same as those of the electric power converter and the driving apparatus according to Embodiment 1, excluding the duty amount setting method in the control unit 300; therefore, explanations therefor will be omitted. With regard to the duty amount setting method, the operational actions of the control unit described in Embodiment 1 and the second calculation unit 350 are different from each other; thus, the difference will be explained hereinafter.

In the second calculation unit 350, the subtractor 321 calculates a duty amount estimation value (1−Dmain) by use of the main duty amount Dmain calculated by the first calculation unit 310. The divider 329 calculates Vin/Vout; then, the subtractor 323 calculates the difference between Vin/Vout calculated by the divider 329 and the duty amount estimation value (1−Dmain) calculated by the subtractor 321. The difference value is the one to which calculation processing is applied in the second controller 324a. This value is the one obtained by dividing the input-voltage estimation value Vincal, described in Embodiment 1, by the output voltage Vout. The second controller 324a multiplies the calculation result in the subtractor 323 by the value of Kd. Kd is calculated, for example, by means of P control, PI control, PID control, or the like. In this situation, as Kd, either a fixed value or a variable value, described in Embodiment 2, may be utilized. In Embodiment 5, for the sake of convenience, the calculation result in the second controller 324 a is regarded as the sub-duty amount Dsub'. The limiter 326 applies appropriate limiter processing to the obtained Dsub' so as to limit the value thereof, so that the sub-duty amount Dsub is calculated.

The electric power converter and the driving apparatus described in Embodiment 5 are configured in such a manner as described above; therefore, there can be obtained an effect the same as that of the electric power converter and the driving apparatus described in Embodiment 1. Moreover, in comparison with the electric power converter and the driving apparatus described in each of Embodiments 1 and 3, the circuit for the second calculation unit 320 can be omitted. In the case of implementation in the SW (software) of a microcomputer or the like, the calculation processing in the second calculation unit 320 can be omitted.

Embodiment 6

Figure 13:
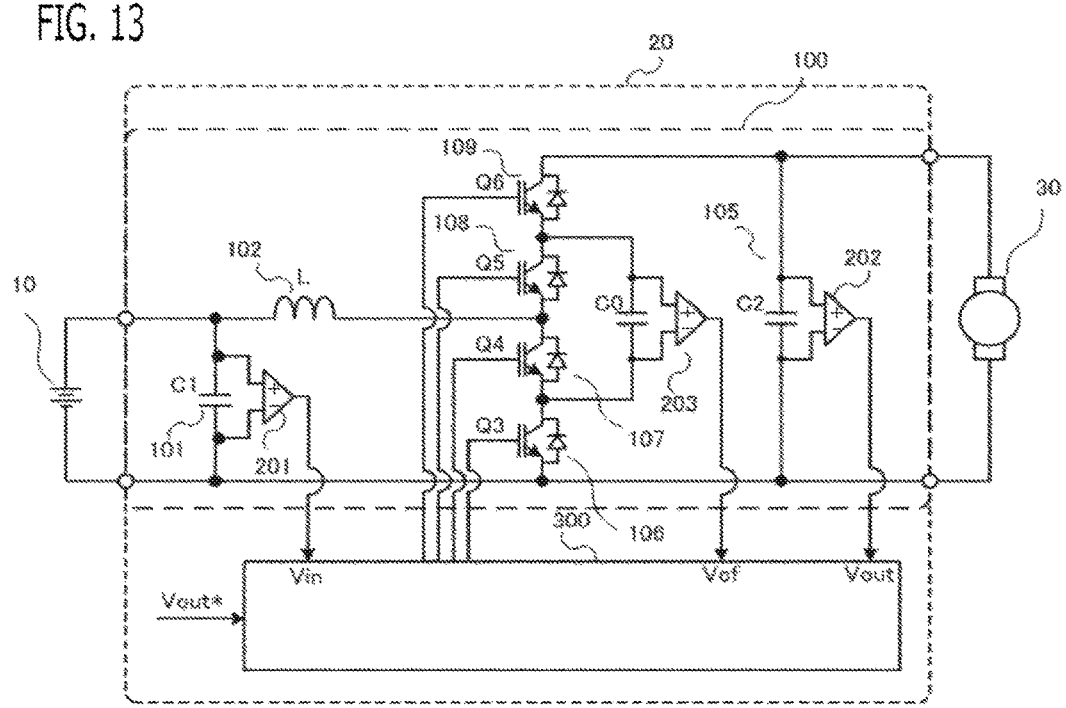
FIG. 13 is a configuration diagram representing an electric power converter and a driving apparatus described in Embodiment 6 of the present invention.

With regard to the electric power converter described in Embodiment 1, there has been explained a configuration in which as the electric-power conversion unit, a DC/DC converter provided with two switching devices is utilized; however, with regard to an electric power converter described in Embodiment 6, there will be explained a configuration in which as the electric-power conversion unit, a multi-level converter is utilized. FIG. 13 is a configuration diagram representing the configurations of an electric power converter and a driving apparatus according to Embodiment 6. In FIG. 13, the DC power source 10 and the motor 30 are the same as those in Embodiment 1; thus, explanations therefor will be omitted. As the control unit 300 in the electric power converter 20, any one of the control units described in the foregoing embodiments may be utilized.

The electric-power conversion unit 100 is a boosting chopper circuit including the input capacitor (C1) 101, the reactor (L1) 102, a first switching device (Q3) 106, a second switching device (Q4) 107, a third switching device (Q5) 108, a fourth switching device (Q6) 109, an output capacitor (C2) 105, and a flying capacitor (C0) 111. The input voltage detection unit 201, the output voltage detection unit 202, and a flying capacitor voltage detection unit 203, which detects voltage across the respective capacitors, are provided.

The input capacitor (C1) 101 is connected in parallel with the DC power source 10, and one of the terminals of the reactor (L1) 102 is connected with the input capacitor (C1) 101. One of the terminals of the output capacitor (C2) 105 is connected with the drain of the fourth switching device (Q6) 109, and the other one thereof is connected with the input capacitor (C1) 101. The respective terminals of the flying capacitor (C0) 111 is connected with the connection point between the first and the second switching devices and the connection point between the third and the fourth switching devices.

The drain of the first switching device (Q3) 106 is connected with the source of the second switching device (Q4) 107, and the other terminal thereof is connected with the input capacitor (C1) 101. The drain of the second switching device (Q4) 107 is connected with the other terminal of the reactor (L1) 102. One of the terminals of the flying capacitor (C0) 111 is connected with the connection portion between the first switching device (Q3) 106 and the second switching device (Q4) 107. The source of the third switching device (Q5) 108 is connected with the connection portion between the reactor (L1) 102 and the second switching device (Q4) 107, and the drain thereof is connected with the other terminal of the flying capacitor (C0) 111. The source of the fourth switching device (Q6) 109 is connected with the drain of the third switching device (Q5) 108, and the drain thereof is connected with the output capacitor (C2) 105. The other terminal of the output capacitor (C2) 105 is connected with the connection portion between the input capacitor (C1) 101 and the first switching device (Q3) 106.

Each of the first switching device (Q3) 106, the second switching device (Q4) 107, the third switching device (Q5) 108, and the fourth switching device (Q6) 109 is a switching semiconductor; for example, an IGBT, an MOSFET, or the like is utilized. The first switching device (Q3) 106 and the fourth switching device (Q6) 109 perform complementary switching, based on gate signals generated by the control unit 300. The second switching device (Q4) 107 and the third switching device (Q5) 108 perform complementary switching, based on gate signals generated by the control unit 300.

Furthermore, the respective phases of the gate signals of the first switching device (Q3) 103 and the second switching device (Q4) 104 are shifted by 180° from each other, with respect to the switching frequency (fsw). In order to prevent short-circuiting caused by a phenomenon in which both the first and fourth switching devices turn on, there is provided an appropriate dead time period during which both the first and fourth switching devices turn off; in order to prevent short-circuiting caused by a phenomenon in which both the second and third switching devices turn on, there is provided an appropriate dead time period during which both the second and third switching devices turn off.

The input voltage detection unit 201, which is connected across the input capacitor (C1) 101, is a voltage sensor that detects an input voltage yin of the electric power converter 20. The output voltage detection unit 202, which is connected across the output capacitor (C2) 105, is a voltage sensor that detects an output voltage Vout of the electric power converter 20. The flying capacitor voltage detection unit 203 is connected across the flying capacitor (C0) 111. In order to prevent erroneous detection caused by a ripple voltage or noise corresponding to a switching frequency, each of these detection units has an appropriate lowpass filter circuit. It is not necessarily required that these detection units are provided in the electric-power conversion unit 100; they may be provided outside the electric-power conversion unit 100.

Next, the operation will be explained. The duty amount calculation method of the electric power converter according to Embodiment 6 may be any one of the methods described in the foregoing embodiments 1 through 5; the operation of each of the switching devices is controlled based on the calculated duty amount.

Figure 14:
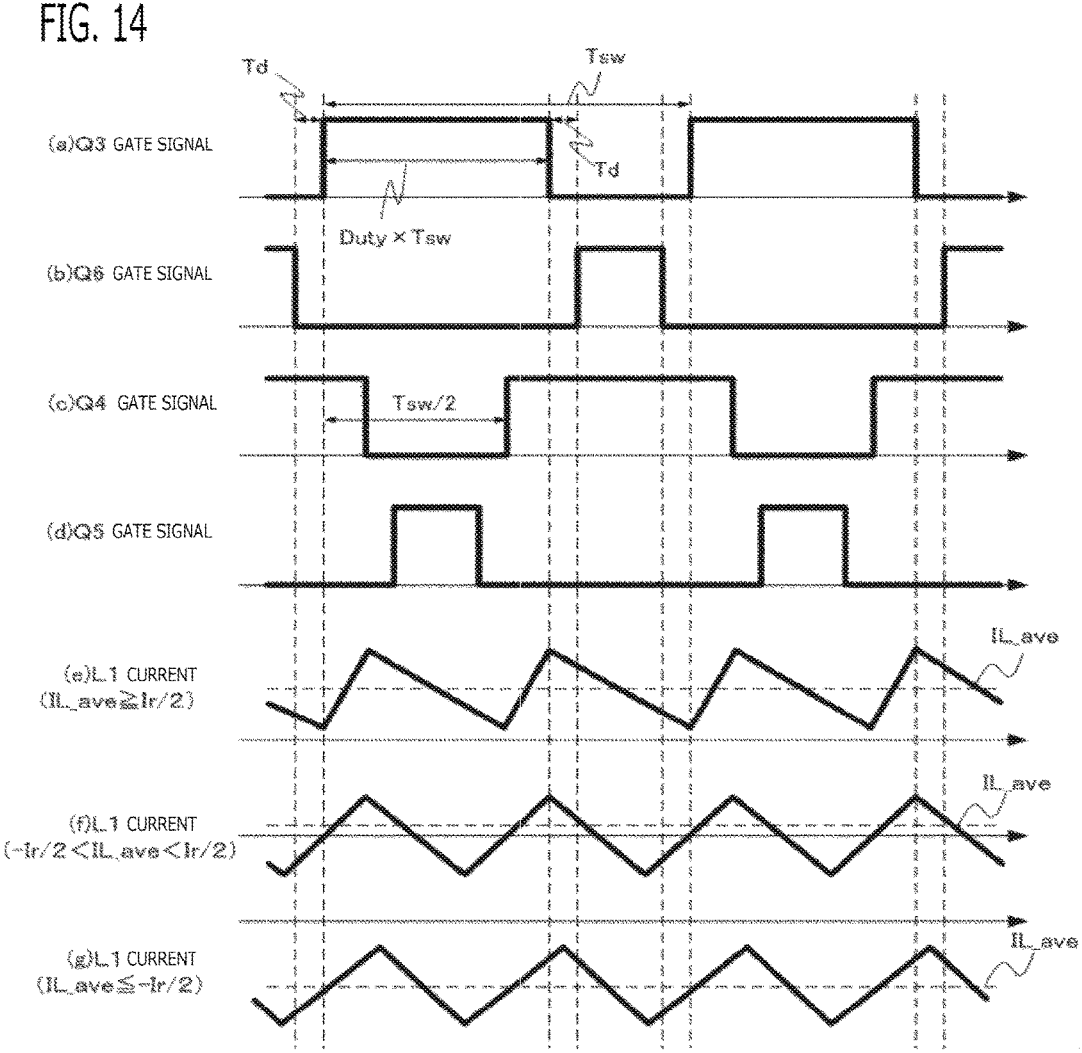
FIG. 14 is a chart representing the relationship between a gate signal and a current flowing in a reactor in the electric power converter described in Embodiment 6 of the present invention.

FIG. 14 is a chart representing the relationship between the gate signals and the currents flowing in the reactor in the electric power converter. The respective gate signals for the first through fourth switching devices Q3, Q4, Q5, and Q6 in the electric-power conversion unit 100 and the reactor currents will be explained based on FIG. 14. In FIG. 14, (a), (b), (c), and (d) represent the waveform of the gate signal for the first switching device (Q3) 106, the waveform of the gate signal for the fourth switching device (Q6) 109, the waveform of the gate signal for the second switching device (Q4) 107, and the waveform of the gate signal for the third switching device (Q5) 108, respectively. Each of the switching devices performs on/off-operation in accordance with an inputted gate signal. Each of (e) through (g) represents the waveform of the current that flows in the reactor (L1) 102; the waveform corresponding to the value of the average current IL_ave in the reactor L1 is represented. Letting Ir denote the ripple current in the reactor L1, (e), (f), and (g) represent the case where [IL_ave≥Ir/2] is established, the case where [−Ir/2<IL_ave<Ir/2] is established, and the case where [IL_ave≤−Ir/2] is established, respectively.

At first, there will be explained the power-running operation, i.e., the case where the average value (IL_ave) of the current flowing in the reactor (L1) 102 is larger than "0". In the power-running operation, the control unit 300 transmits the respective gate signals to the first through fourth switching devices 106 through 109 so that each of the switching devices is made to perform on/off operation.

While each of the switching devices is made to repeatedly perform on/off-operation and hence the voltage to be applied across the motor 30 is boosted up to a target voltage, input electric power from the DC power source 10 is transmitted to the motor 30. In the motor 30 to which DC electric power transmitted through the electric power converter 20 is inputted, the internal inverter circuit inverts the DC electric power into AC electric power, so that the driving unit of the motor 30 is driven and rotated.

In FIG. 14, in the period in which the first switching device (Q3) 106 is on, the fourth switching device (Q6) 109 is off, the second switching device (Q4) 107 is on, and the third switching device (Q5) 108 is off, the energy accumulated in the output capacitor 105 is discharged. In the period in which the first switching device (Q3) 106 is on, the fourth switching device (Q6) 109 is off, the second switching device (Q4) 107 is off, and the third switching device (Q5) 108 is on, the energy accumulated in the output capacitor 105 is discharged and energy inputted from the DC power source 10 to the electric power converter 20 is accumulated in the flying capacitor 111. In the period in which the first switching device (Q3) 106 is off, the fourth switching device (Q6) 109 is on, the second switching device (Q4) 107 is on, and the third switching device (Q5) 108 is off, the energy inputted from the DC power source 10 to the electric power converter 20 is accumulated in the flying capacitor 111 and the output capacitor 105. The time ratio (duty amount) of the period in which the first switching device (Q3) 106 is on is appropriately adjusted, so that the output voltage Vout between the third terminal 100c and the fourth terminal 100d can be controlled to be an arbitrary voltage. In this situation, the control unit 300 determines the duty amount; based on the determined duty amount, the control unit 300 transmits the respective gate signals to the switching devices so as to control the electric-power conversion unit 100.

Next, the regenerative operation, i.e., the case where [IL_ave<0] is established will be explained.

As is the case with the power-running operation, the control unit 300 transmits the respective gate signals to the first through fourth switching devices 106 through 109, also in the regenerative operation, so that each of the switching devices is made to operate. While each of the switching devices is made to repeatedly perform on/off-operation and hence the voltage to be applied across the motor 30 is boosted up to a target voltage, input electric power from the motor 30 is transmitted to the DC power source 10 and DC electric power is charged inside the DC power source 10.

In FIG. 14, in the period in which the first switching device (Q3) 106 is on, the fourth switching device (Q6) 109 is off, the second switching device (Q4) 107 is on, and the third switching device (Q5) 108 is off, the energy inputted from the motor 30 is accumulated in the output capacitor 105. In the period in which the first switching device (Q3) 106 is on, the fourth switching device (Q6) 109 is off, the second switching device (Q4) 107 is off, and the third switching device (Q5) 108 is on, the energy inputted from the motor 30 is accumulated in the output capacitor 105 and the energy in the flying capacitor 111 is discharged to the DC power source 10. In the period in which the first switching device (Q3) 106 is off, the fourth switching device (Q6) 109 is on, the second switching device (Q4) 107 is on, and the third switching device (Q5) 108 is off, the energy accumulated in the output capacitor 105 is discharged to the DC power source 10 and energy is accumulated in the flying capacitor 111. As is the case with the power-running operation, the time ratios (duty amounts) of these operation modes are appropriately adjusted, so that the output voltage Vout between the third terminal 100c and the fourth terminal 100d can be controlled to be an arbitrary voltage. In this situation, the control unit 300 determines the duty amounts and then, the control unit 300 transmits the respective gate signals to the electric-power conversion unit 100, so that the operation based on the calculated duty amounts can be performed.

In both the power-running operation and the regenerative operation, the first switching device (Q3) 106 and the fourth switching device (Q6) 109 perform complementary switching, and the dead time (Td) for preventing short-circuiting is provided. The second switching device (Q4) 107 and the third switching device (Q5) 108 also perform complementary switching, and the dead time (Td) for preventing short-circuiting is provided. The first switching device (Q3) 106 and the second switching device (Q4) 107 perform respective switching actions whose phases are shifted by 180° from each other. Each of the on times of the first and second switching devices Q3 and Q4 is the multiplication of the duty amount calculated by the control unit and the switching period (1/Tsw=fsw).

The voltage Vcf across the flying capacitor (C0) 111 is controlled in such a way as to always become half as high as Vout. The waveform of the reactor current in this situation will be represented. As is the case with Embodiment 1, the switching device that turns on during the dead time (Td) changes depending on whether the reactor (L1) is positive or negative; thus, it is required to change the duty amount. In the case where switching is performed by use of the electric-power conversion unit 100 described in Embodiment 6 and the gate signal represented in FIG. 14, the frequency of the reactor current becomes twice as high as the switching frequency, and the voltage applied to the reactor 102 becomes half as high as that in Embodiment 1.

Because in the electric power converter and the driving apparatus described in Embodiment 6, the switching frequency of the reactor current is doubled, the state in which a discontinuous current is caused by the dead time occurs twice as frequent as that state in Embodiment 1; thus, the effect of providing the second calculation unit 320 is obtained much more. Furthermore, because a multi-level converter is utilized as the electric-power conversion unit, the reactor 102 can be downsized.

The electric power converter described in Embodiment 6 is configured in such a way that a 2-level multi-level converter is utilized; however, it goes without saying that a 3- or more-level multi-level converter may be utilized.

Figure 15:
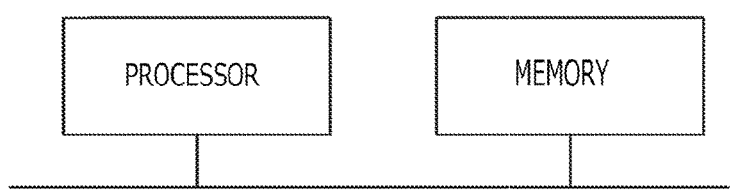
FIG. 15 is a block diagram illustrating the configuration of each of the control units described in Embodiments 1 through 6 of the present invention.

Each of the calculation circuits of the control units described in Embodiments 1 through 6 may be realized either by hardware or by software. When realized by software, the calculation circuit can be realized by use of a storage device and a processing device, as illustrated in FIG. 15; the processing device (processor) reads and implements a program stored in the storage device (memory), so that the calculation circuit can be realized.

REFERENCE SIGNS LIST

10: DC power source
20: electric power converter
30: motor
100: electric-power conversion unit
100a through 100d: terminal
101: input capacitor
102: reactor
103: 1st switching device
104: 2nd switching device
105: output capacitor
106: 1st switching device
107: 2nd switching device
108: 3rd switching device
109: 4th switching device
201: input voltage detection unit (1st voltage detection unit)
202: output voltage detection unit (2nd voltage detection unit)
300: control unit
310: 1st calculation unit
311: subtractor
312: 1st controller
320: 2nd calculation unit
321: subtractor
322: multiplier
323: subtractor
324: 2nd controller
325: divider
326: limiter
330: adder
340: 2nd calculation unit
350: 2nd calculation unit

The invention claimed is:

1. An electric power converter comprising:
an electric-power conversion circuit that performs bidirectional transmission of electric power between a first terminal and a second terminal;
a first voltage detector that detects an inter-terminal voltage of the first terminal of the electric-power conversion circuit;
a second voltage detector that detects an inter-terminal voltage of the second terminal of the electric-power conversion circuit; and
a controller that controls operation of the electric-power conversion circuit,
wherein the controller includes
a first calculator that calculates a main duty amount, based on a difference between a predetermined target voltage and the inter-terminal voltage, of the second terminal, that is detected by the second voltage detector, and
a second calculator that calculates an estimation voltage value of the inter-terminal voltage of the first terminal, based on the main duty amount calculated by the first calculator and the inter-terminal voltage, of the second terminal, that is detected by the second voltage detector, and then calculates a sub-duty amount, based on the estimation voltage value and the inter-terminal voltage, of the first terminal, that is detected by the first voltage detector, and
wherein the controller calculates a duty amount for operating the electric-power conversion circuit, based on the main duty amount and the sub-duty amount.

2. The electric power converter according to claim 1, wherein the second calculator calculates the sub-duty amount, by multiplying a difference value between the estimation voltage value and the inter-terminal voltage, of the first terminal, that is detected by the first voltage detector by a variable coefficient determined based on the inter-terminal voltage, of the second terminal, that is detected by the first voltage detector and the inter-terminal voltage, of the first terminal, that is detected by the second voltage detector.

3. The electric power converter according to claim 1, wherein the second calculator has a limiter that applies limiter processing to the sub-duty amount to limit a variable range of the sub-duty amount.

4. The electric power converter according to claim 1, further comprising a current detector that detects a current flowing in a reactor provided in the electric-power conversion circuit, wherein the second calculator calculates the sub-duty amount, based on the current detected by the current detector.

5. The electric power converter according to claim 1, wherein the electric-power conversion circuit performs bidirectional transmission of electric power between the first terminal and the second terminal, by use of a multi-level converter.

6. An electric power converter comprising:
an electric-power conversion circuit that performs bidirectional transmission of electric power between a first terminal and a second terminal;
a first voltage detector that detects an inter-terminal voltage of the first terminal of the electric-power conversion circuit;
a second voltage detector that detects an inter-terminal voltage of the second terminal of the electric-power conversion circuit; and
a controller that controls operation of the electric-power conversion circuit,
wherein the controller includes
a first calculator that calculates a main duty amount, based on the difference between a predetermined target voltage and the inter-terminal voltage, of the second terminal, that is detected by the second voltage detector, and
a second calculator that calculates a duty amount estimation value, based on the main duty amount calculated by the first calculator, and then calculates the sub-duty amount, based on the duty amount estimation value, the inter-terminal voltage, of the first terminal, that is detected by the first voltage detector, and the inter-terminal voltage, of the second terminal, that is detected by the second voltage detector,
wherein the controller calculates a duty amount for operating the electric-power conversion circuit, based on the main duty amount and the sub-duty amount.

7. The electric power converter according to claim 6, wherein the second calculator includes a limiter that applies limiter processing to the sub-duty amount to limit a variable range of the sub-duty amount.

8. The electric power converter according to claim 6, further comprising a current detector that detects a current flowing in a reactor provided in the electric-power conversion circuit, wherein the second calculator calculates the sub-duty amount, based on the current detected by the current detector.

9. The electric power converter according to claim 6, wherein the electric-power conversion circuit performs bidirectional transmission of electric power between the first terminal and the second terminal, by use of a multi-level converter.

10. A driving apparatus including a DC power source, a motor, and an electric power converter, a first terminal of which is connected with the DC power source and a second terminal of which is connected with the motor,
   wherein the electric power converter includes
      an electric-power conversion circuit that performs bidirectional transmission of electric power between the DC power source and the motor,
      a first voltage detector that detects an inter-terminal voltage at the DC power source side of the electric-power conversion circuit,
      a second voltage detector that detects an inter-terminal voltage at the motor side of the electric-power conversion circuit, and
      a controller that controls conversion operation of the electric-power conversion circuit;
   wherein the controller includes
      a first calculator that calculates a main duty amount, based on a predetermined target voltage and the inter-terminal voltage, at the motor side, that is detected by the second voltage detector, and
      a second calculator that calculates a sub-duty amount, based on the inter-terminal voltage, at the DC power source side, that is calculated from the main duty amount calculated by the first calculator and the inter-terminal voltage, at the motor side, that is detected by the second voltage detector and the inter-terminal voltage, at the DC power source side, that is detected by the first voltage detector, and
   wherein the controller calculates a duty amount for operating the electric-power conversion circuit, based on the main duty amount and the sub-duty amount.

* * * * *